United States Patent
Qiu et al.

(10) Patent No.: US 11,816,043 B2
(45) Date of Patent: Nov. 14, 2023

(54) SYSTEM AND METHOD FOR MANAGING RESOURCES OF A STORAGE DEVICE AND QUANTIFYING THE COST OF I/O REQUESTS

(71) Applicant: Alibaba Group Holding Limited, Grand Cayman (KY)

(72) Inventors: Sheng Qiu, Sunnyvale, CA (US); Yu Du, Hangzhou (CN); Fei Liu, Sunnyvale, CA (US); Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 323 days.

(21) Appl. No.: 16/964,134

(22) PCT Filed: Jun. 25, 2018

(86) PCT No.: PCT/CN2018/092632
§ 371 (c)(1),
(2) Date: Jul. 22, 2020

(87) PCT Pub. No.: WO2020/000136
PCT Pub. Date: Jan. 2, 2020

(65) Prior Publication Data
US 2021/0365390 A1  Nov. 25, 2021

(51) Int. Cl.
*G06F 13/16* (2006.01)
(52) U.S. Cl.
CPC ................. *G06F 13/161* (2013.01)
(58) Field of Classification Search
CPC ....... G06F 2209/501; G06F 2209/5019; G06F 2209/203; G06F 2209/504; G06F 2209/502; G06F 13/161; G06F 9/5027
See application file for complete search history.

(56) References Cited

U.S. PATENT DOCUMENTS 3,893,071 A  7/1975  Bossen
4,562,494 A  12/1985  Bond
(Continued)

FOREIGN PATENT DOCUMENTS

JP  2003022209  1/2003
JP  2011175422  9/2011
(Continued)

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

(Continued)

*Primary Examiner* — Raymond N Phan
(74) *Attorney, Agent, or Firm* — Shun Yao; YAO LEGAL SERVICES, INC.

(57) ABSTRACT

One embodiment facilitates measurement of a performance of a storage device. During operation, the system determines a normalized cost for an I/O request, wherein the normalized cost is independent of an access pattern and a type of the I/O request, wherein the normalized cost is indicated by a first number of virtual I/O operations consumed by the I/O request, and wherein a virtual I/O operation is used as a logical unit of cost associated with physical I/O operations. The system identifies a performance metric for the storage device by calculating a second number of virtual I/O operations per second which can be executed by the storage device. The system allocates incoming I/O requests to the storage device based on the performance metric, e.g., to satisfy a Quality of Service requirement, thereby causing an enhanced measurement of the performance of the storage device.

18 Claims, 12 Drawing Sheets

(56) References Cited

U.S. PATENT DOCUMENTS

| | | |
|---|---|---|
| 4,718,067 A | 1/1988 | Peters |
| 4,775,932 A | 10/1988 | Oxley |
| 4,858,040 A | 8/1989 | Hazebrouck |
| 5,394,382 A | 2/1995 | Hu |
| 5,602,693 A | 2/1997 | Brunnett |
| 5,715,471 A | 2/1998 | Otsuka |
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,226,650 B1 | 5/2001 | Mahajan et al. |
| 6,243,795 B1 | 6/2001 | Yang |
| 6,457,104 B1 | 9/2002 | Tremaine |
| 6,658,478 B1 | 12/2003 | Singhal |
| 6,795,894 B1 | 9/2004 | Neufeld |
| 7,351,072 B2 | 4/2008 | Muff |
| 7,565,454 B2 | 7/2009 | Zuberi |
| 7,599,139 B1 | 10/2009 | Bombet |
| 7,953,899 B1 | 5/2011 | Hooper |
| 7,958,433 B1 | 6/2011 | Yoon |
| 8,024,719 B2 | 9/2011 | Gorton, Jr. |
| 8,085,569 B2 | 12/2011 | Kim |
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,527,544 B1 | 9/2013 | Colgrove |
| 8,751,763 B1 | 6/2014 | Ramarao |
| 8,819,367 B1 | 8/2014 | Fallone |
| 8,825,937 B2 | 9/2014 | Atkisson |
| 8,832,688 B2 | 9/2014 | Tang |
| 8,868,825 B1 | 10/2014 | Hayes |
| 8,904,061 B1 | 12/2014 | O'Brien, III |
| 8,949,208 B1 | 2/2015 | Xu |
| 9,015,561 B1 | 4/2015 | Hu |
| 9,031,296 B2 | 5/2015 | Kaempfer |
| 9,043,545 B2 | 5/2015 | Kimmel |
| 9,088,300 B1 | 7/2015 | Chen |
| 9,092,223 B1 | 7/2015 | Pani |
| 9,129,628 B1 | 9/2015 | Fallone |
| 9,141,176 B1 | 9/2015 | Chen |
| 9,208,817 B1 | 12/2015 | Li |
| 9,213,627 B2 | 12/2015 | Van Acht |
| 9,213,632 B1 | 12/2015 | Song |
| 9,251,058 B2 | 2/2016 | Nellans |
| 9,258,014 B2 | 2/2016 | Anderson |
| 9,280,472 B1 | 3/2016 | Dang |
| 9,280,487 B2 | 3/2016 | Candelaria |
| 9,311,939 B1 | 4/2016 | Malina |
| 9,336,340 B1 | 5/2016 | Dong |
| 9,436,595 B1 | 9/2016 | Benitez |
| 9,495,263 B2 | 11/2016 | Pang |
| 9,529,601 B1 | 12/2016 | Dharmadhikari |
| 9,529,670 B2 | 12/2016 | O'Connor |
| 9,569,454 B2 | 2/2017 | Ebsen |
| 9,575,982 B1 | 2/2017 | Sankara Subramanian |
| 9,588,698 B1 | 3/2017 | Karamcheti |
| 9,588,977 B1 | 3/2017 | Wang |
| 9,607,631 B2 | 3/2017 | Rausch |
| 9,671,971 B2 | 6/2017 | Trika |
| 9,722,632 B2 | 8/2017 | Anderson |
| 9,747,202 B1 | 8/2017 | Shaharabany |
| 9,830,084 B2 | 11/2017 | Thakkar |
| 9,836,232 B1 | 12/2017 | Vasquez |
| 9,852,076 B1 | 12/2017 | Garg |
| 9,875,053 B2 | 1/2018 | Frid |
| 9,910,705 B1 | 3/2018 | Mak |
| 9,912,530 B2 | 3/2018 | Singatwaria |
| 9,923,562 B1 | 3/2018 | Vinson |
| 9,933,973 B2 | 4/2018 | Luby |
| 9,946,596 B2 | 4/2018 | Hashimoto |
| 9,971,548 B1* | 5/2018 | Talwar .............. G06F 3/0613 |
| 10,013,169 B2 | 7/2018 | Fisher |
| 10,199,066 B1 | 2/2019 | Feldman |
| 10,229,735 B1 | 3/2019 | Natarajan |
| 10,235,198 B2 | 3/2019 | Qiu |
| 10,268,390 B2 | 4/2019 | Warfield |
| 10,318,467 B2 | 6/2019 | Barzik |
| 10,361,722 B2 | 7/2019 | Lee |
| 10,417,086 B2 | 9/2019 | Lin |
| 10,437,670 B1 | 10/2019 | Koltsidas |
| 10,459,663 B2 | 10/2019 | Agombar |
| 10,459,794 B2 | 10/2019 | Baek |
| 10,466,907 B2 | 11/2019 | Gole |
| 10,484,019 B2 | 11/2019 | Weinberg |
| 10,503,535 B1* | 12/2019 | Hickey .............. G06F 11/3006 |
| 10,530,391 B2 | 1/2020 | Galbraith |
| 10,635,529 B2 | 4/2020 | Bolkhovitin |
| 10,642,522 B2 | 5/2020 | Li |
| 10,649,657 B2 | 5/2020 | Zaidman |
| 10,649,969 B2 | 5/2020 | De |
| 10,678,432 B1 | 6/2020 | Dreier |
| 10,756,816 B1 | 8/2020 | Dreier |
| 10,831,734 B2 | 11/2020 | Li |
| 10,884,636 B1* | 1/2021 | Abrol .............. G06F 3/0631 |
| 10,928,847 B2 | 2/2021 | Suresh |
| 10,990,526 B1 | 4/2021 | Lam |
| 11,016,932 B2 | 5/2021 | Qiu |
| 11,023,150 B2 | 6/2021 | Pletka |
| 11,068,165 B2 | 7/2021 | Sharon |
| 11,068,409 B2 | 7/2021 | Li |
| 11,126,561 B2 | 9/2021 | Li |
| 11,138,124 B2 | 10/2021 | Tomic |
| 11,243,694 B2 | 2/2022 | Liang |
| 11,340,939 B1* | 5/2022 | Barker, Jr. .............. G06F 3/0647 |
| 11,360,863 B2 | 6/2022 | Varadan |
| 11,442,669 B1* | 9/2022 | Frandzel .............. G06F 3/0619 |
| 2001/0003205 A1 | 6/2001 | Gilbert |
| 2001/0032324 A1 | 10/2001 | Slaughter |
| 2001/0046295 A1 | 11/2001 | Sako |
| 2002/0010783 A1 | 1/2002 | Primak |
| 2002/0039260 A1 | 4/2002 | Kilmer |
| 2002/0073358 A1 | 6/2002 | Atkinson |
| 2002/0095403 A1 | 7/2002 | Chandrasekaran |
| 2002/0112085 A1 | 8/2002 | Berg |
| 2002/0161890 A1 | 10/2002 | Chen |
| 2003/0074319 A1 | 4/2003 | Jaquette |
| 2003/0145274 A1 | 7/2003 | Hwang |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0066741 A1 | 4/2004 | Dinker |
| 2004/0103238 A1 | 5/2004 | Avraham |
| 2004/0143718 A1 | 7/2004 | Chen |
| 2004/0255171 A1 | 12/2004 | Zimmer |
| 2004/0267752 A1 | 12/2004 | Wong |
| 2004/0268278 A1 | 12/2004 | Hoberman |
| 2005/0038954 A1 | 2/2005 | Saliba |
| 2005/0097126 A1 | 5/2005 | Cabrera |
| 2005/0138325 A1 | 6/2005 | Hofstee |
| 2005/0144358 A1 | 6/2005 | Conley |
| 2005/0149827 A1 | 7/2005 | Lambert |
| 2005/0174670 A1 | 8/2005 | Dunn |
| 2005/0177672 A1 | 8/2005 | Rao |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0031709 A1 | 2/2006 | Hiraiwa |
| 2006/0101197 A1 | 5/2006 | Georgis |
| 2006/0156009 A1 | 7/2006 | Shin |
| 2006/0156012 A1 | 7/2006 | Beeson |
| 2006/0184813 A1 | 8/2006 | Bui |
| 2007/0033323 A1 | 2/2007 | Gorobets |
| 2007/0061502 A1 | 3/2007 | Lasser |
| 2007/0061542 A1 | 3/2007 | Uppala |
| 2007/0101096 A1 | 5/2007 | Gorobets |
| 2007/0168581 A1 | 7/2007 | Klein |
| 2007/0204128 A1 | 8/2007 | Lee |
| 2007/0250756 A1 | 10/2007 | Gower |

(56) References Cited

U.S. PATENT DOCUMENTS

| | | |
|---|---|---|
| 2007/0266011 A1 | 11/2007 | Rohrs |
| 2007/0283081 A1 | 12/2007 | Lasser |
| 2007/0283104 A1 | 12/2007 | Wellwood |
| 2007/0285980 A1 | 12/2007 | Shimizu |
| 2008/0028223 A1 | 1/2008 | Rhoads |
| 2008/0034154 A1 | 2/2008 | Lee |
| 2008/0065805 A1 | 3/2008 | Wu |
| 2008/0082731 A1 | 4/2008 | Karamcheti |
| 2008/0104369 A1 | 5/2008 | Reed |
| 2008/0112238 A1 | 5/2008 | Kim |
| 2008/0163033 A1 | 7/2008 | Yim |
| 2008/0195829 A1 | 8/2008 | Wilsey |
| 2008/0301532 A1 | 12/2008 | Uchikawa |
| 2009/0006667 A1 | 1/2009 | Lin |
| 2009/0089544 A1 | 4/2009 | Liu |
| 2009/0110078 A1 | 4/2009 | Crinon |
| 2009/0113219 A1 | 4/2009 | Aharonov |
| 2009/0125788 A1 | 5/2009 | Wheeler |
| 2009/0177944 A1 | 7/2009 | Kanno |
| 2009/0183052 A1 | 7/2009 | Kanno |
| 2009/0254705 A1 | 10/2009 | Abali |
| 2009/0282275 A1 | 11/2009 | Yermalayeu |
| 2009/0287956 A1 | 11/2009 | Flynn |
| 2009/0307249 A1 | 12/2009 | Koifman |
| 2009/0307426 A1 | 12/2009 | Galloway |
| 2009/0310412 A1 | 12/2009 | Jang |
| 2010/0031000 A1 | 2/2010 | Flynn |
| 2010/0169470 A1 | 7/2010 | Takashige |
| 2010/0217952 A1 | 8/2010 | Iyer |
| 2010/0229224 A1 | 9/2010 | Etchegoyen |
| 2010/0241848 A1 | 9/2010 | Smith |
| 2010/0281254 A1 | 11/2010 | Carro |
| 2010/0321999 A1 | 12/2010 | Yoo |
| 2010/0325367 A1 | 12/2010 | Kornegay |
| 2010/0332922 A1 | 12/2010 | Chang |
| 2011/0031546 A1 | 2/2011 | Uenaka |
| 2011/0055458 A1 | 3/2011 | Kuehne |
| 2011/0055471 A1 | 3/2011 | Thatcher |
| 2011/0060722 A1 | 3/2011 | Li |
| 2011/0072204 A1 | 3/2011 | Chang |
| 2011/0099418 A1 | 4/2011 | Chen |
| 2011/0153903 A1 | 6/2011 | Hinkle |
| 2011/0161621 A1 | 6/2011 | Sinclair |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0289263 A1 | 11/2011 | McWilliams |
| 2011/0289280 A1 | 11/2011 | Koseki |
| 2011/0292538 A1 | 12/2011 | Haga |
| 2011/0296411 A1 | 12/2011 | Tang |
| 2011/0299317 A1 | 12/2011 | Shaeffer |
| 2011/0302353 A1 | 12/2011 | Confalonieri |
| 2011/0302408 A1 | 12/2011 | McDermott |
| 2012/0017037 A1 | 1/2012 | Riddle |
| 2012/0039117 A1 | 2/2012 | Webb |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0151253 A1 | 6/2012 | Horn |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0233523 A1 | 9/2012 | Krishnamoorthy |
| 2012/0246392 A1 | 9/2012 | Cheon |
| 2012/0278579 A1 | 11/2012 | Goss |
| 2012/0284587 A1 | 11/2012 | Yu |
| 2012/0324312 A1 | 12/2012 | Moyer |
| 2012/0331207 A1 | 12/2012 | Lassa |
| 2013/0013880 A1 | 1/2013 | Tashiro |
| 2013/0013887 A1 | 1/2013 | Sugahara |
| 2013/0016970 A1 | 1/2013 | Koka |
| 2013/0018852 A1 | 1/2013 | Barton |
| 2013/0024605 A1 | 1/2013 | Sharon |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0138871 A1 | 5/2013 | Chiu |
| 2013/0144836 A1 | 6/2013 | Adzic |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0159723 A1 | 6/2013 | Brandt |
| 2013/0166820 A1 | 6/2013 | Batwara |
| 2013/0173845 A1 | 7/2013 | Aslam |
| 2013/0179898 A1 | 7/2013 | Fang |
| 2013/0191601 A1 | 7/2013 | Peterson |
| 2013/0205183 A1 | 8/2013 | Fillingim |
| 2013/0219131 A1 | 8/2013 | Alexandron |
| 2013/0227347 A1 | 8/2013 | Cho |
| 2013/0238955 A1 | 9/2013 | D Abreu |
| 2013/0254622 A1 | 9/2013 | Kanno |
| 2013/0318283 A1 | 11/2013 | Small |
| 2013/0318395 A1 | 11/2013 | Kalavade |
| 2013/0325419 A1 | 12/2013 | Al-Shaikh |
| 2013/0329492 A1 | 12/2013 | Yang |
| 2013/0346532 A1 | 12/2013 | D Amato |
| 2014/0006688 A1 | 1/2014 | Yu |
| 2014/0019650 A1 | 1/2014 | Li |
| 2014/0019661 A1 | 1/2014 | Hormuth |
| 2014/0025638 A1 | 1/2014 | Hu |
| 2014/0082273 A1 | 3/2014 | Segev |
| 2014/0082412 A1 | 3/2014 | Matsumura |
| 2014/0095758 A1 | 4/2014 | Smith |
| 2014/0095769 A1 | 4/2014 | Borkenhagen |
| 2014/0095827 A1 | 4/2014 | Wei |
| 2014/0108414 A1 | 4/2014 | Stillerman |
| 2014/0108891 A1 | 4/2014 | Strasser |
| 2014/0164447 A1 | 6/2014 | Tarafdar |
| 2014/0164879 A1 | 6/2014 | Tam |
| 2014/0181532 A1 | 6/2014 | Camp |
| 2014/0195564 A1 | 7/2014 | Talagala |
| 2014/0215129 A1 | 7/2014 | Kuzmin |
| 2014/0223079 A1 | 8/2014 | Zhang |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0337457 A1 | 11/2014 | Nowoczynski |
| 2014/0359229 A1 | 12/2014 | Cota-Robles |
| 2014/0365707 A1 | 12/2014 | Talagala |
| 2014/0379965 A1 | 12/2014 | Gole |
| 2015/0006792 A1 | 1/2015 | Lee |
| 2015/0019798 A1 | 1/2015 | Huang |
| 2015/0039849 A1 | 2/2015 | Lewis |
| 2015/0067436 A1 | 3/2015 | Hu |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0143030 A1 | 5/2015 | Gorobets |
| 2015/0186657 A1 | 7/2015 | Nakhjiri |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0286477 A1 | 10/2015 | Mathur |
| 2015/0294684 A1 | 10/2015 | Qjang |
| 2015/0301964 A1 | 10/2015 | Brinicombe |
| 2015/0304108 A1 | 10/2015 | Obukhov |
| 2015/0310916 A1 | 10/2015 | Leem |
| 2015/0317095 A1 | 11/2015 | Voigt |

(56) References Cited

U.S. PATENT DOCUMENTS

| | | |
|---|---|---|
| 2015/0341123 A1 | 11/2015 | Nagarajan |
| 2015/0347025 A1 | 12/2015 | Law |
| 2015/0363271 A1 | 12/2015 | Haustein |
| 2015/0363328 A1 | 12/2015 | Candelaria |
| 2015/0370700 A1 | 12/2015 | Sabol |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048327 A1 | 2/2016 | Jayasena |
| 2016/0048341 A1 | 2/2016 | Constantinescu |
| 2016/0054922 A1 | 2/2016 | Awasthi |
| 2016/0062885 A1 | 3/2016 | Ryu |
| 2016/0077749 A1 | 3/2016 | Ravimohan |
| 2016/0077764 A1 | 3/2016 | Ori |
| 2016/0077968 A1 | 3/2016 | Sela |
| 2016/0078245 A1 | 3/2016 | Amarendran |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0124742 A1 | 5/2016 | Rangasamy |
| 2016/0132237 A1 | 5/2016 | Jeong |
| 2016/0141047 A1 | 5/2016 | Sehgal |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0203000 A1 | 7/2016 | Parmar |
| 2016/0224267 A1 | 8/2016 | Yang |
| 2016/0232103 A1 | 8/2016 | Schmisseur |
| 2016/0234297 A1 | 8/2016 | Ambach |
| 2016/0239074 A1 | 8/2016 | Lee |
| 2016/0239380 A1 | 8/2016 | Wideman |
| 2016/0274636 A1 | 9/2016 | Kim |
| 2016/0283140 A1 | 9/2016 | Kaushik |
| 2016/0306699 A1 | 10/2016 | Resch |
| 2016/0306853 A1 | 10/2016 | Sabaa |
| 2016/0321002 A1 | 11/2016 | Jung |
| 2016/0335085 A1 | 11/2016 | Scalabrino |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2016/0381442 A1 | 12/2016 | Heanue |
| 2017/0004037 A1 | 1/2017 | Park |
| 2017/0010652 A1 | 1/2017 | Huang |
| 2017/0068639 A1 | 3/2017 | Davis |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0123655 A1 | 5/2017 | Sinclair |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0185316 A1 | 6/2017 | Nieuwejaar |
| 2017/0185498 A1 | 6/2017 | Gao |
| 2017/0192848 A1 | 7/2017 | Pamies-Juarez |
| 2017/0199823 A1 | 7/2017 | Hayes |
| 2017/0212680 A1 | 7/2017 | Waghulde |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0262217 A1 | 9/2017 | Pradhan |
| 2017/0269998 A1 | 9/2017 | Sunwoo |
| 2017/0277655 A1 | 9/2017 | Das |
| 2017/0279460 A1 | 9/2017 | Camp |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0069658 A1 | 3/2018 | Benisty |
| 2018/0074730 A1 | 3/2018 | Inoue |
| 2018/0076828 A1 | 3/2018 | Kanno |
| 2018/0081832 A1* | 3/2018 | Longo .................. H04L 67/10 |
| 2018/0088867 A1 | 3/2018 | Kaminaga |
| 2018/0107591 A1 | 4/2018 | Smith |
| 2018/0113631 A1 | 4/2018 | Zhang |
| 2018/0143780 A1 | 5/2018 | Cho |
| 2018/0150640 A1 | 5/2018 | Li |
| 2018/0165038 A1 | 6/2018 | Authement |
| 2018/0165169 A1 | 6/2018 | Camp |
| 2018/0165340 A1 | 6/2018 | Agarwal |
| 2018/0167268 A1 | 6/2018 | Liguori |
| 2018/0173620 A1 | 6/2018 | Cen |
| 2018/0188970 A1 | 7/2018 | Liu |
| 2018/0189175 A1 | 7/2018 | Ji |
| 2018/0189182 A1 | 7/2018 | Wang |
| 2018/0212951 A1 | 7/2018 | Goodrum |
| 2018/0219561 A1 | 8/2018 | Litsyn |
| 2018/0226124 A1 | 8/2018 | Perner |
| 2018/0232151 A1 | 8/2018 | Badam |
| 2018/0260148 A1 | 9/2018 | Klein |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0307620 A1 | 10/2018 | Zhou |
| 2018/0321864 A1 | 11/2018 | Benisty |
| 2018/0322024 A1 | 11/2018 | Nagao |
| 2018/0329776 A1 | 11/2018 | Lai |
| 2018/0336921 A1 | 11/2018 | Ryun |
| 2018/0349396 A1 | 12/2018 | Blagojevic |
| 2018/0356992 A1 | 12/2018 | Lamberts |
| 2018/0357126 A1 | 12/2018 | Dhuse |
| 2018/0373428 A1 | 12/2018 | Kan |
| 2018/0373655 A1 | 12/2018 | Liu |
| 2018/0373664 A1 | 12/2018 | Vijayrao |
| 2019/0004944 A1 | 1/2019 | Widder |
| 2019/0012111 A1 | 1/2019 | Li |
| 2019/0034454 A1 | 1/2019 | Gangumalla |
| 2019/0042571 A1 | 2/2019 | Li |
| 2019/0050312 A1 | 2/2019 | Li |
| 2019/0050327 A1 | 2/2019 | Li |
| 2019/0065085 A1 | 2/2019 | Jean |
| 2019/0073261 A1 | 3/2019 | Halbert |
| 2019/0073262 A1 | 3/2019 | Chen |
| 2019/0087089 A1 | 3/2019 | Yoshida |
| 2019/0087115 A1 | 3/2019 | Li |
| 2019/0087328 A1 | 3/2019 | Kanno |
| 2019/0108145 A1 | 4/2019 | Raghava |
| 2019/0116127 A1 | 4/2019 | Pismenny |
| 2019/0166725 A1 | 5/2019 | Jing |
| 2019/0171532 A1 | 6/2019 | Abadi |
| 2019/0172820 A1 | 6/2019 | Meyers |
| 2019/0196748 A1 | 6/2019 | Badam |
| 2019/0196907 A1 | 6/2019 | Khan |
| 2019/0205206 A1 | 7/2019 | Hornung |
| 2019/0212949 A1 | 7/2019 | Pletka |
| 2019/0220392 A1 | 7/2019 | Lin |
| 2019/0227927 A1 | 7/2019 | Miao |
| 2019/0272242 A1 | 9/2019 | Kachare |
| 2019/0278654 A1 | 9/2019 | Kaynak |
| 2019/0278849 A1 | 9/2019 | Chandramouli |
| 2019/0317901 A1 | 10/2019 | Kachare |

(56) References Cited

U.S. PATENT DOCUMENTS

| | | |
|---|---|---|
| 2019/0320020 A1 | 10/2019 | Lee |
| 2019/0339998 A1 | 11/2019 | Momchilov |
| 2019/0361611 A1 | 11/2019 | Hosogi |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0042387 A1 | 2/2020 | Shani |
| 2020/0082006 A1 | 3/2020 | Rupp |
| 2020/0084918 A1 | 3/2020 | Shen |
| 2020/0089430 A1 | 3/2020 | Kanno |
| 2020/0092209 A1 | 3/2020 | Chen |
| 2020/0097189 A1 | 3/2020 | Tao |
| 2020/0133841 A1 | 4/2020 | Davis |
| 2020/0143885 A1 | 5/2020 | Kim |
| 2020/0159425 A1 | 5/2020 | Flynn |
| 2020/0167091 A1 | 5/2020 | Haridas |
| 2020/0210309 A1 | 7/2020 | Jung |
| 2020/0218449 A1 | 7/2020 | Leitao |
| 2020/0225875 A1 | 7/2020 | Oh |
| 2020/0242021 A1 | 7/2020 | Gholamipour |
| 2020/0250032 A1 | 8/2020 | Goyal |
| 2020/0257598 A1 | 8/2020 | Yazovitsky |
| 2020/0322287 A1 | 10/2020 | Connor |
| 2020/0326855 A1 | 10/2020 | Wu |
| 2020/0328192 A1 | 10/2020 | Zaman |
| 2020/0348888 A1 | 11/2020 | Kim |
| 2020/0364094 A1 | 11/2020 | Kahle |
| 2020/0371955 A1 | 11/2020 | Goodacre |
| 2020/0387327 A1 | 12/2020 | Hsieh |
| 2020/0401334 A1 | 12/2020 | Saxena |
| 2020/0409559 A1 | 12/2020 | Sharon |
| 2020/0409791 A1 | 12/2020 | Devriendt |
| 2021/0010338 A1 | 1/2021 | Santos |
| 2021/0075633 A1 | 3/2021 | Sen |
| 2021/0089392 A1 | 3/2021 | Shirakawa |
| 2021/0103388 A1 | 4/2021 | Choi |
| 2021/0124488 A1 | 4/2021 | Stoica |
| 2021/0132999 A1 | 5/2021 | Haywood |
| 2021/0191635 A1 | 6/2021 | Hu |
| 2021/0263795 A1 | 8/2021 | Li |
| 2021/0286555 A1 | 9/2021 | Li |

FOREIGN PATENT DOCUMENTS

| | | |
|---|---|---|
| WO | 9418634 | 8/1994 |
| WO | 1994018634 | 8/1994 |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017 <10.1145/3124680.3124741>. <hal-01654985>.

EMC Powerpoath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhaving the Lifespan of Flash Memory based Solid State Devices" < FAST '11, San Jose, CA Feb. 15-17, 2011, pp. 1-14.

Wu, Huijun et al. "HPDedep: A Hybrid Prioritized Data Deduplication Mechanism for Primary Storage in the Cloud", Cornell Univ. arXiv: 1702.08153v2[Cs.DC], Apr. 16, 2017, pp. 1-14https://www.syncids.com/#.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinet: Chapter 44; flash-based SSDs, available at http://pages.cs.wisc.edu/~remzi/OSTEP/.

Jimenex, C., Novo, D. and P. Ienne, "Pheonix:Reviving MLC Blocks as SLC to Extend NAND Flash Devices Lifetime," Design, Automation & Text in Europe Conference & Exhibition (Date), 2013.

Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

C. Wu, D. Wu, H. Chou and C. Cheng, "Rethink the Design of Flash Translation Layers in a Component-Based View", in IEEE Acess, vol. 5, pp. 12895-12912, 2017.

Po-Liang Wu, Yuan-Hao Chang and T. Kuo, "A file-system-aware FTL design for flash-memory storange systems," 2009, pp. 393-398.

S. Choudhuri and T. Givargis, "Performance improvement of block based NAND flash translation layer", 2007 5th IEEE/ACM/IFIP International Conference on Hardware/Software Codesign and Systems Synthesis (CODES+ISSS). Saizburg, 2007, pp. 257-262.

A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.

J. Jung and Y. Won, "nvramdisk: A Transactional Block Device Driver for Non-Volatile RAM", in IEEE Transactions on Computers, vol. 65, No. 2, pp. 589-600, Feb. 1, 2016.

Te I et al. (Pensieve: a Machine Assisted SSD Layer for Extending the Lifetime: (Year: 2018).

Arm ("Cortex-R5 and Cortex-R5F", Technical reference Manual, Revision r1p1) (Year:2011).

* cited by examiner

← 600

```
Req dequeue()
{
    bool found = false;

//anti-starvation policy
    Req req = get_starvation_request();
    if (req) {
        found = true;
    } else {
        //priority queue
        req = get_request_from_priority_queue();
        if (req && has_sufficient_io_budget(req)) {
            found = true;
        }
    } if (found) {
        //update available viops budget
        update_io_budget(req);

//update last dispatched IO's timestamp of current req's priority
        update_starvation_timestamp(req);

//remove request from priority queue
        remove_request_from_priority_queue(req);
        return req;
    } else {
        return NULL;
    }
}
```

FIG. 6

DATA STRUCTURE
750

| LATENCY RANGE 752 | MAXIMUM VIOPS EXECUTABLE BY THE STORAGE DEVICE 754 |
|---|---|
| ENTRY 760 { 101 MICROSEC – 300 MICROSEC | 300,000 VIOPS |
| ENTRY 762 { 301 MICROSEC – 500 MICROSEC | 200,000 VIOPS |
| ... | ... |
| ... | ... |

FIG. 7B

SYSTEM AND METHOD FOR MANAGING RESOURCES OF A STORAGE DEVICE AND QUANTIFYING THE COST OF I/O REQUESTS

BACKGROUND

Field

This disclosure is generally related to the field of data storage. More specifically, this disclosure is related to a system and method for managing the resources of a storage device and for quantifying the cost of input/output (I/O) requests.

Related Art

The proliferation of the Internet and e-commerce continues to create a vast amount of digital content. Various storage systems and servers have been created to access and store such digital content. In cloud or clustered storage systems, multiple applications may share the underlying system resources (e.g., of a storage device). Managing the resources of a storage device is critical both for the performance of the system, and to satisfy any Quality of Service (QoS) requirements (e.g., in a service level agreement). A metric is needed which can quantify the performance capability of a storage device. Conventional performance metrics such as input/output operations per second (IOPS) or throughput may be useful for quantifying the performance capability of a storage device under specific workloads, such as a workload with all read requests or all write requests).

However, in mixed workloads (e.g., with a dynamic ratio of read requests versus write requests distributed across a varying range of request sizes), neither the read nor the write bandwidth may be directly used to indicate the performance capability of a storage device. Furthermore, in a storage device such as a solid state drive (SSD), the read and write performance may be asymmetric because of the characteristics of the NAND media and the internal garbage collection mechanism. Thus, conventional performance metrics cannot effectively evaluate the performance capability of a storage device across a wide range of mixed workloads and request sizes. This limitation on a versatile performance metric can create result in a decreased accuracy in identifying the performance capabilities of a storage device, which can result in an ineffective management of the underlying resources of the storage device. This in turn can result in a reduced performance in the overall efficiency of a cloud or a clustered storage system, and may also impact the scalability of a distributed storage system.

SUMMARY

One embodiment facilitates measurement of a performance of a storage device. During operation, the system determines a normalized cost for an I/O request, wherein the normalized cost is independent of an access pattern and a type of the I/O request, wherein the normalized cost is indicated by a first number of virtual I/O operations consumed by the I/O request, and wherein a virtual I/O operation is used as a logical unit of cost associated with physical I/O operations. The system identifies a performance metric for the storage device by calculating a second number of virtual I/O operations per second which can be executed by the storage device. The system allocates incoming I/O requests to the storage device based on the performance metric, e.g., to satisfy a Quality of Service requirement, thereby causing an enhanced measurement of the performance of the storage device.

In some embodiments, determining the normalized cost comprises determining a cost factor for the I/O request, which involves: selecting a set of test cost factor values; executing varied workloads on the storage device based on varying I/O request sizes and a varying ratio of read I/O requests to write I/O requests; measuring the performance of the storage device based on a third number of virtual I/O operations per second executed on the storage device for each workload; determining a test cost factor value which projects a most constant virtual I/O operations per second performance across all the workloads; and setting the cost factor for the I/O request to the determined test cost factor value.

In some embodiments, determining the normalized cost further comprises: determining a first ratio of a size of the I/O request to a predetermined size for a base unit; and scaling the first ratio by the determined cost factor for the I/O request.

In some embodiments, the system generates a data structure which maps a range of latency values to a fourth number of virtual I/O operations per second that can be executed by the storage device.

In some embodiments, the system obtains the data structure in response to one or more of: initiating a startup or a configuration procedure; and requesting, by the storage device or by a user or application associated with the storage device, the data structure.

In some embodiments, the system determines a specific read latency or a specific write latency based on a size of a specific I/O request. The system performs a lookup in the data structure, based on the specific read latency or the specific write latency, to obtain a fifth number of virtual I/O operations per second mapped to a second range of latency values which include the specific read latency or the specific write latency.

In some embodiments, the system assigns portions of the second number of virtual I/O operations per second to one or more applications. The system receives a second I/O request from an application. The system schedules the second I/O request based on a respective portion of the second number of virtual I/O operations per second assigned to the application.

In some embodiments, assigning the portions of the second number of virtual I/O operations per second is based on one or more of: a priority associated with a respective application; a user associated with the respective application; and a predetermined time period which, when exceeded, causes a refresh or reassigning of the portions of the second number of virtual I/O operations per second to the one or more application.

In some embodiments, scheduling the second I/O request is further based on: a priority associated with the second I/O request; a priority associated with the respective application; and a user associated with the respective application.

BRIEF DESCRIPTION OF THE FIGURES

FIG. 6 presents exemplary pseudocode for scheduling or dispatching an I/O request based on priority and allocated VIOPS, in accordance with an embodiment of the present application.

FIG. 7B illustrates an exemplary data structure mapping target latency range values to VIOPS capability in a given storage device, in accordance with an embodiment of the present application.

In the figures, like reference numerals refer to the same figure elements.

DETAILED DESCRIPTION

Figure 1:
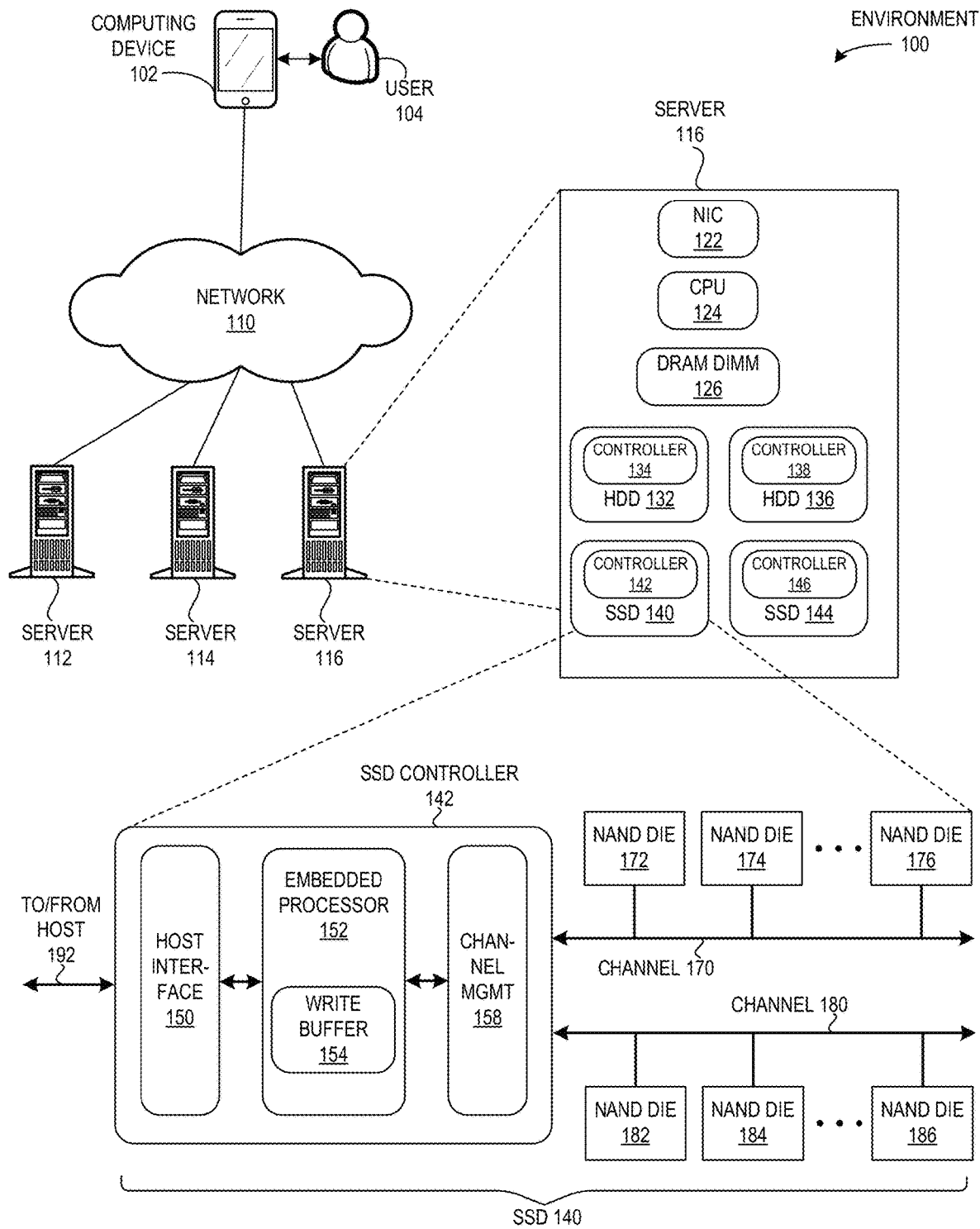
FIG. 1 illustrates an exemplary environment that facilitates measurement of the performance of a storage device, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein provide a system which solves the problem of providing a metric to quantify the performance of a storage device given a workload which consists of varying types of I/O requests (e.g., a dynamic ratio of read requests versus write requests).

In cloud or clustered storage systems, multiple applications may share the underlying system resources (e.g., of a storage device). Managing the resources of a storage device is critical both for the performance of the system, and to satisfy any Quality of Service (QoS) requirements (e.g., in a service level agreement). A metric is needed which can quantify the performance capability of a storage device. Conventional performance metrics such as input/output operations per second (TOPS) or throughput may be useful for quantifying the performance capability of a storage device under specific workloads, such as a workload with all read requests or all write requests).

However, in mixed workloads (e.g., with a dynamic ratio of read requests versus write requests distributed across a varying range of request sizes), neither the read nor the write bandwidth may be directly used to indicate the performance capability of a storage device. Furthermore, in a storage device such as an SSD, the read and write performance may be asymmetric because of the characteristics of the NAND media and the internal garbage collection mechanism. Thus, conventional performance metrics cannot effectively evaluate the performance capability of a storage device across a wide range of mixed workloads and request sizes. This limitation on a versatile performance metric can create result in a decreased accuracy in identifying the performance capabilities of a storage device, which can result in an ineffective management of the underlying resources of the storage device. This in turn can result in a reduced performance in the overall efficiency of a cloud or a clustered storage system, and may also impact the scalability of a distributed storage system.

The embodiments described herein address these limitations by providing a system which uses a new performance metric "virtual I/O operations per second" or "VIOPS" to generalize the concept of bandwidth in a storage device (e.g., an SSD). The system can normalize the resource cost of varying I/O requests on a target storage device, independent of the access pattern (e.g., random or sequential) and the type (e.g., read or write) of the I/O request. The system measures the cost of an individual I/O request by using the consumed number of virtual I/Os.

I/O requests can vary based on various characteristics or features of the request, including, e.g., the request type (read or write), the request size, and the access pattern (random or sequential). The number of VIOs consumed by an I/O request depends on the various characteristics of the I/O request. For example, a 4 KB random read may consume one virtual I/O, while a 4 KB random write may consume more than one virtual I/O. A virtual I/O operation is used as a logical unit of cost associated with physical I/O operations. The system can use a formula to calculate the number of virtual I/Os consumed by serving any random storage request (i.e., a read or a write request of any size), for a given storage device. Thus, the cost of an actual I/O request is converted into the consumed number of virtual I/Os on a target storage device. Determining the cost of random I/O requests is described below in relation to FIGS. 3B and 4.

By normalizing the cost of varying I/O requests based on the VIOs and independent of the access pattern or type of a given I/O request, the system can evaluate the performance of the storage device based on the VIOPS, i.e., the number of virtual I/Os served per second. Furthermore, a priority-based I/O scheduler component can leverage the VIOPS model to accurately control service resources among different I/O services or applications as described below in relation to FIG. 5. In a distributed storage system with multiple storage servers and storage devices, incoming I/O requests may be allocated to a particular storage device based on the calculated VIOPS for the particular storage device. That is, the scheduler component can determine, based on the calculated VIOPS for each of the multiple storage devices in the distributed storage system, how to allocate, distribute, dispatch, and schedule the incoming I/O requests among the multiple storage devices.

Thus, the embodiments described herein provide a system which improves and enhances the efficiency and performance of a storage system. By measuring the cost of any random I/O request using VIOs, the system can normalize the cost of varying I/O requests (by converting the cost of an I/O request to a number of VIOs consumed by a given storage device). The system can also identify a new performance metric with which to evaluate the storage device (by calculating a number of VIOPS served by the storage device). By using the VIOPS as the performance metric for the storage device, the system can overcome the deficiencies of the conventional metrics, such as TOPS or throughput, which are limited to quantifying performance under specific workloads. The embodiments described herein can thus more accurately provide a measurement of the performance of a storage device by accounting for mixed workloads, e.g., with a dynamic ratio between read requests and write requests, and varying sizes of I/O requests. In this way, and unlike conventional performance metrics, the system enhances the measurement of the performance of the storage device. Furthermore, by allocating incoming I/O requests based on the more accurate and flexible performance metric of VIOPS, the embodiments described herein enhance the overall efficiency and performance of a distributed storage system.

Exemplary Environment and Network

FIG. 1 illustrates an exemplary environment 100 that facilitates measurement of the performance of a storage device, in accordance with an embodiment of the present application. Environment 100 can include a computing device 102 and an associated user 104. Computing device 102 can communicate via a network 110 with storage servers 112, 114, and 116, which can be part of a distributed storage system and accessed via client servers (not shown). A storage server can include multiple storage devices, and each storage device can include a controller and multiple physical media for data storage. For example, server 116 can include: a network interface card (NIC) 122; a CPU 124; a DRAM DIMM 126; hard disk drives (HDDs) 132 and 136 (with, respectively, controllers 134 and 138); and SSDs 140 and 144 (with, respectively, controllers 142 and 146).

A controller can include interfaces to a host and to a non-volatile memory. For example, SSD 140 can include SSD controller 142. Controller 142 can include: a host interface 150; an embedded processor 152; and a channel management 158. SSD controller 142 can communicate with a host (e.g., via host interface 150 and a communication to/from host 192). SSD controller 142 can also communicate with the non-volatile memory (via channel management 158). The non-volatile memory can be accessed via multiple channels. For example, NAND dies 172, 174, and 176 may be accessed via a channel 170, and NAND dies 182, 184, and 186 may be accessed via a channel 180.

During operation, in the embodiments described herein, SSD 140, via SSD controller 142, may receive various I/O requests (e.g., via communication 192). The cost of an individual I/O request (i.e., VIO) and the identification of a performance metric (i.e., VIOPS) for SSD 140 may be determined by a component or module not residing in SSD 140. A priority-aware I/O scheduler, as described below in relation to FIGS. 2A and 2B, can use the determined cost and performance metric to dispatch incoming I/O requests which have different priorities, characteristics (e.g., size, type, and access pattern), and allocated overall VIOPS.

Figure 2A:
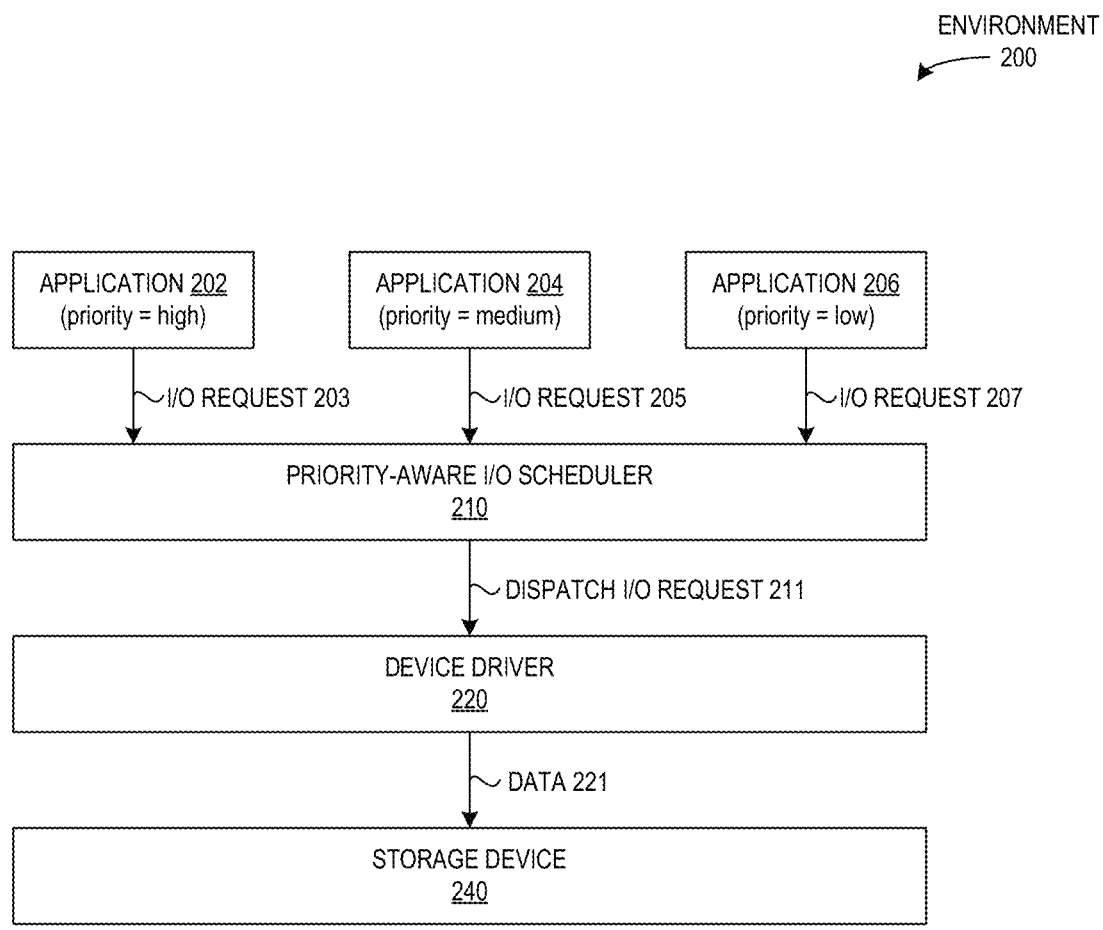
FIG. 2A illustrates an exemplary environment for facilitating measurement of the performance of a storage device, in accordance with an embodiment of the present application.

FIG. 2A illustrates an exemplary environment 200 for facilitating measurement of the performance of a storage device, in accordance with an embodiment of the present application. Environment 200 can include: an application 202, where incoming requests from application 202 are marked with a "high" priority; an application 204, where incoming requests from application 204 are marked with a "medium" priority; and an application 206, where incoming requests from application 206 are marked with a "medium" priority. Each of applications 202, 204, and 206 may also be associated with a previously allocated portion of the overall VIOPS for the given storage device.

During operation, an application can send an I/O request, which is received and dispatched by a scheduler component based on the priority of the I/O request, a previously allocated amount of VIOPS for the requesting application, and other factors. For example, application 204 can send an I/O request 205, which is received by priority-aware I/O scheduler 210. Based on the "medium" priority of I/O request 205, as well as any previously allocated amount of VIOPS to application 204, scheduler 210 can schedule and dispatch I/O request 205 (via a communication dispatch I/O request 211) to a device driver 220. Device driver 220 can send data 221 (associated with I/O request 205) to a storage device 240.

Thus, priority-aware I/O scheduler 210 can take into account the priority of an individual I/O request, and can also control the VIOPS usage across various applications based on configured settings, parameters, or rules for VIOPS usage. These factors for VIOPS usage may be pre-configured by a system, a system administrator, or other user. The factors for VIOPS usage may also result in the dynamic allocation of VIOPS usage across various applications, e.g., during operation of the storage system or the storage device, or as part of processing an I/O request.

Figure 2B:
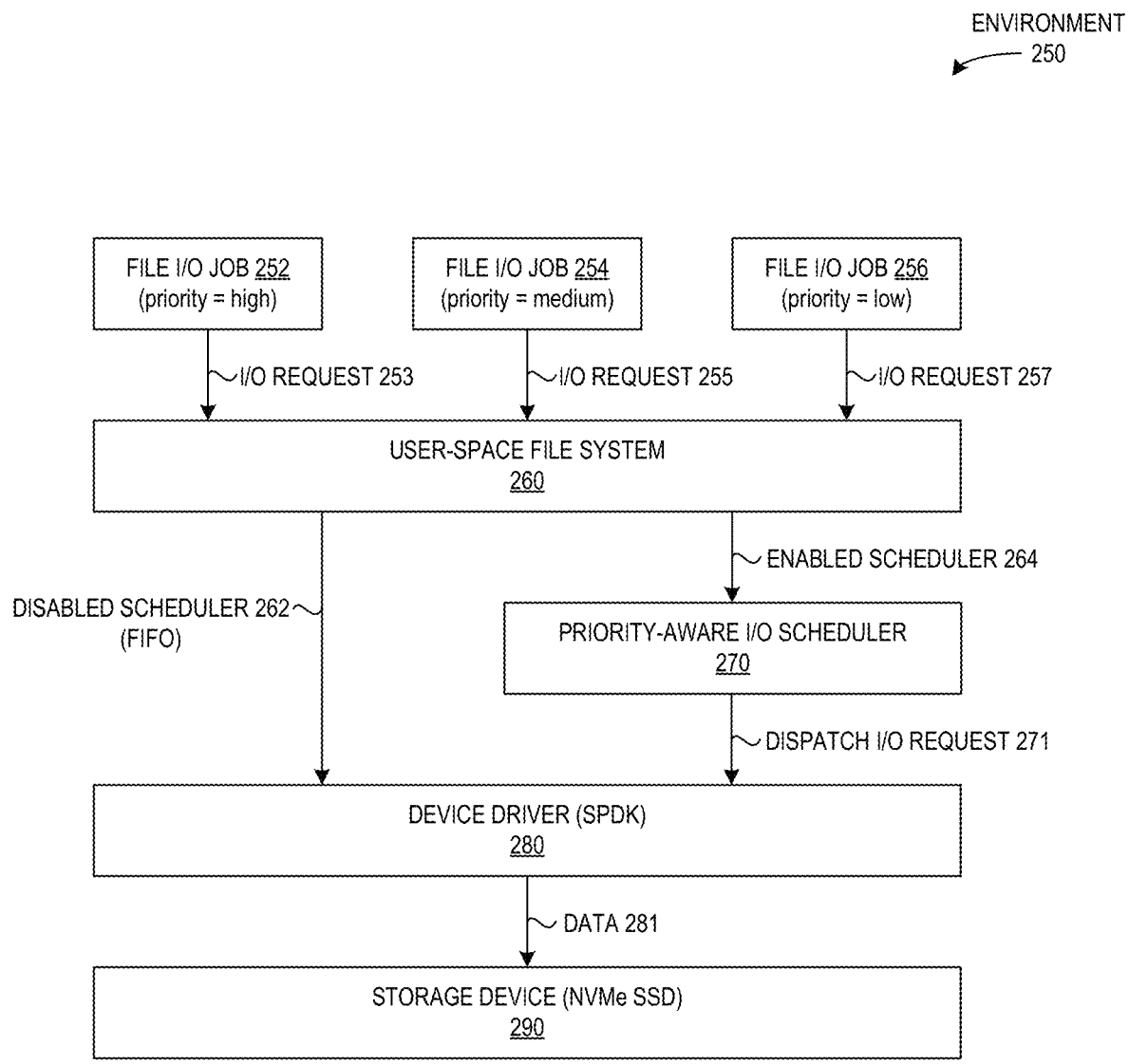
FIG. 2B illustrates an exemplary environment for facilitating measurement of the performance of a storage device, in accordance with an embodiment of the present application.

FIG. 2B illustrates an exemplary environment 250 for facilitating measurement of the performance of a storage device, in accordance with an embodiment of the present application. Environment 250 is similar to environment 200, but includes communications which occur if the priority-aware I/O scheduler is not enabled. Environment 250 can include: a file I/O job 252 marked with a "high" priority; a file I/O job 254 marked with a "medium" priority; and a file I/O job 256 marked with a "low" priority. Each of file I/O jobs 252, 254, and 256 may also be associated with a previously allocated portion of the overall VIOPS for a given storage device.

During operation, file I/O job 252 may be sent as an I/O request 253 to a user-space file system 260. If a priority-aware I/O scheduler is enabled, I/O request 253 can be received by a priority-aware I/O scheduler 270 (via, e.g., an enabled scheduler 264 communication). Based on the "high" priority of I/O request 253, as well as any previously allocated amount of VIOPS to file I/O job 252 (or to an application or a user associated with file I/O job 252), priority-aware I/O scheduler 270 can schedule and dispatch I/O request 253 (via a communication dispatch I/O request 271) to a device driver (SPDK) 280. Device driver 280 can send data 281 (associated with I/O request 253) to a storage device (NVMe SSD) 280.

If the priority-aware I/O scheduler is not enabled (e.g., is disabled, does not exist, or is not recognized), user-space file system 260 can send I/O request 253 directly to a device driver (SPDK) 280, via a disabled scheduler 262 communication. I/O requests which are handled this way may be queued using a first in first out (FIFO) policy.

Figure 3A:
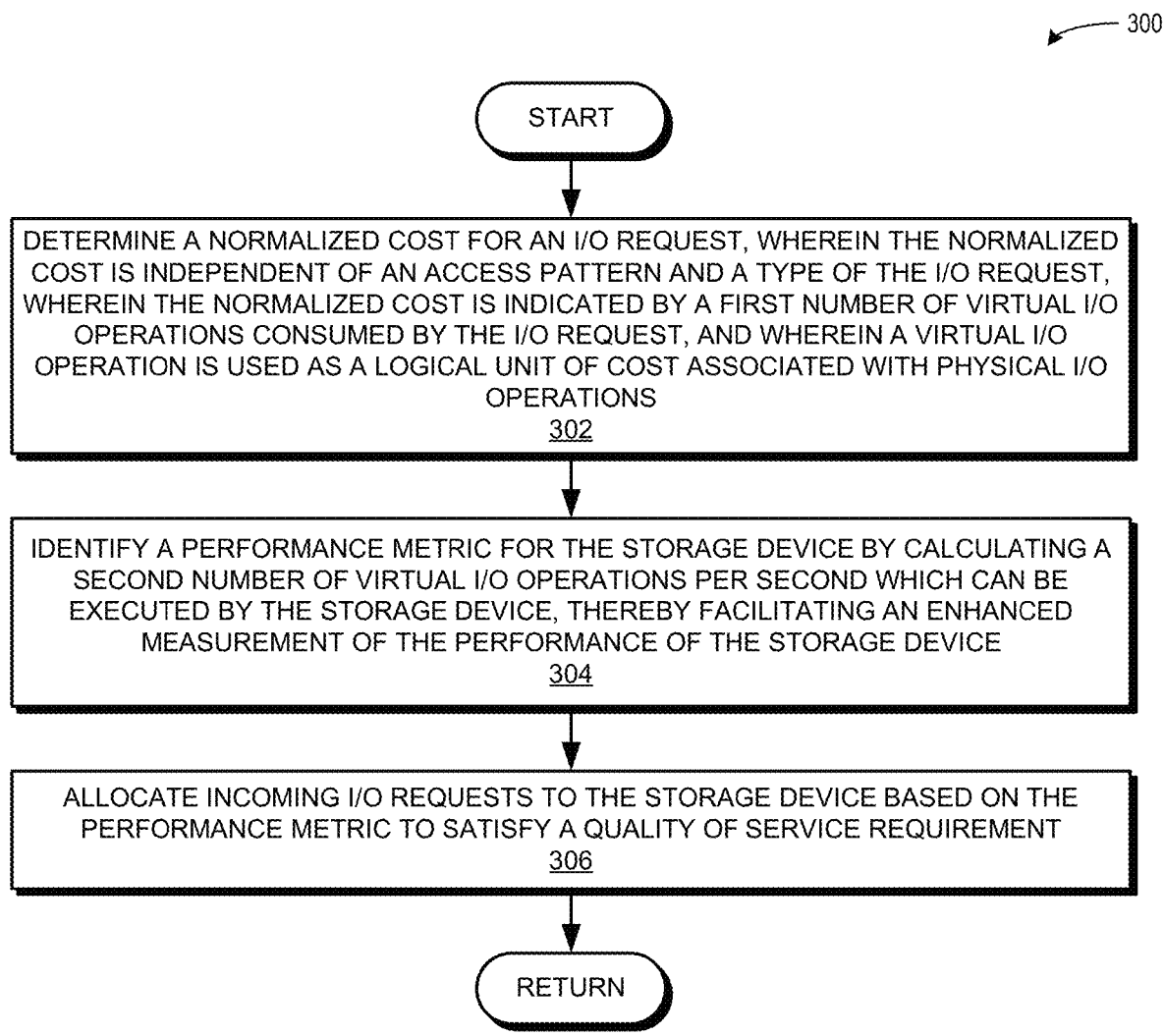
FIG. 3A presents a flowchart illustrating a method for facilitating measurement of the performance of a storage device, in accordance with an embodiment of the present application.

Measuring the Performance of a Storage Device Based on VIOPS; and Determining the Cost and Cost Factor of Individual I/O Requests FIG. 3A presents a flowchart 300 illustrating a method for facilitating measurement of the performance of a storage device, in accordance with an embodiment of the present application. During operation, the system determines a normalized cost for an I/O request, wherein the normalized cost is independent of an access pattern and a type of the I/O request, wherein the normalized cost is indicated by a first number of virtual I/O operations consumed by the I/O request, and wherein a virtual I/O operation is used as a logical unit of cost associated with physical I/O operations (operation 302).

The system identifies a performance metric for the storage device by calculating a second number of virtual I/O operations per second (VIOPS) which can be executed by the storage device, thereby facilitating an enhanced measurement of the performance of the storage device (operation 304). The system allocates incoming I/O requests to the storage device based on the performance metric, e.g., to satisfy a Quality of Service requirement or to achieve an optimal or enhanced load balancing (operation 306).

The normalized cost in operation 302 can be further based on a "cost factor" for the I/O request. For example, the system can calculate the "VIO cost" of a given I/O request based on the cost_factor for the specific I/O request:

$$VIO\_cost=cost\_factor*(request\_size|base\_size). \quad \text{Equation (1)}$$

The request_size is the size of the given I/O request, and the base_size is a predetermined size for a base unit, such as 4 KB. Assume that the cost_factor for a read I/O request is "1," and that the cost_factor for a write I/O request is represented by the variable k. The system can perform a specific procedure to select a value of k (i.e., a cost factor value) which provides the maximum VIOPS performance on a specific storage device.

Figure 3B:
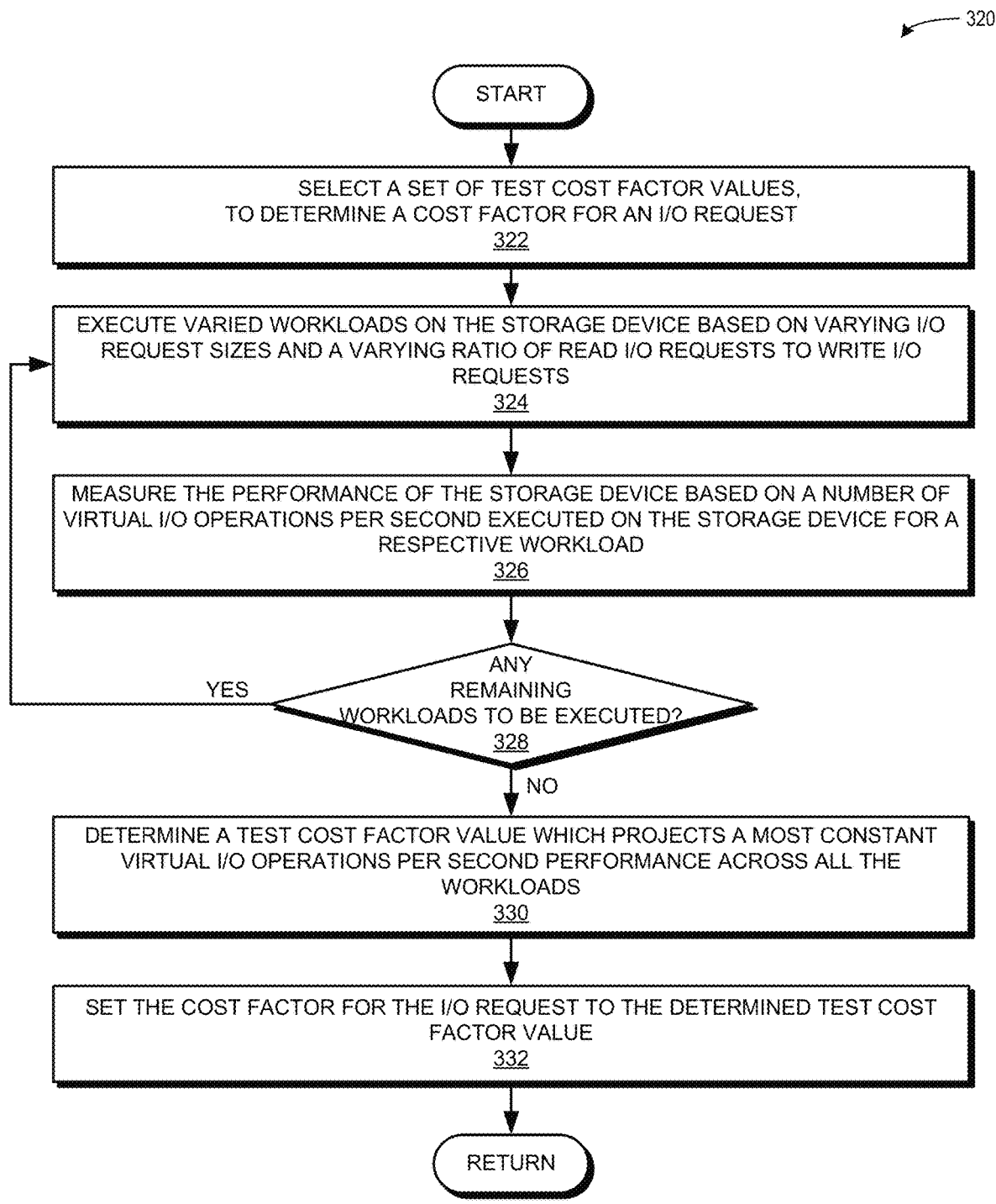
FIG. 3B presents a flowchart illustrating a method for determining the cost factor for an I/O request, in accordance with an embodiment of the present application.

FIG. 3B presents a flowchart 320 illustrating a method for determining the cost factor for an I/O request, in accordance with an embodiment of the present application. During operation, the system selects a set of test cost factor values, to determine a cost factor for an I/O request (operation 322) (e.g., a set of values for k). The system executes varied workloads on a storage device based on varying I/O request sizes and a varying ratio of read I/O requests to write I/O requests (operation 324). For example, a varying ratio of read to write requests can include: 100% read requests to 0% write requests ("100R"); 80% read requests to 20% write requests ("80R"); 50% read requests to 50% write requests ("50R"); and 30% read requests to 70% write requests ("30R"). The system measures the performance of the storage device based on a number of virtual I/O operations per second executed on the storage device for a respective workload (operation 326). If there are remaining workloads to be executed (decision 328), the operation continues as described above for operation 324 (e.g., executing the workload). If there are no remaining workloads to be executed (decision 328), the system determines the cost factor value which projects a most constant virtual I/O operations per second across all the workloads (operation 330). The system sets the cost factor for the I/O request to the determined cost factor value (operation 332). That is, the system identifies a k value which demonstrates or projects the most constant VIOPS, as shown below in relation to FIG. 4

Figure 4:
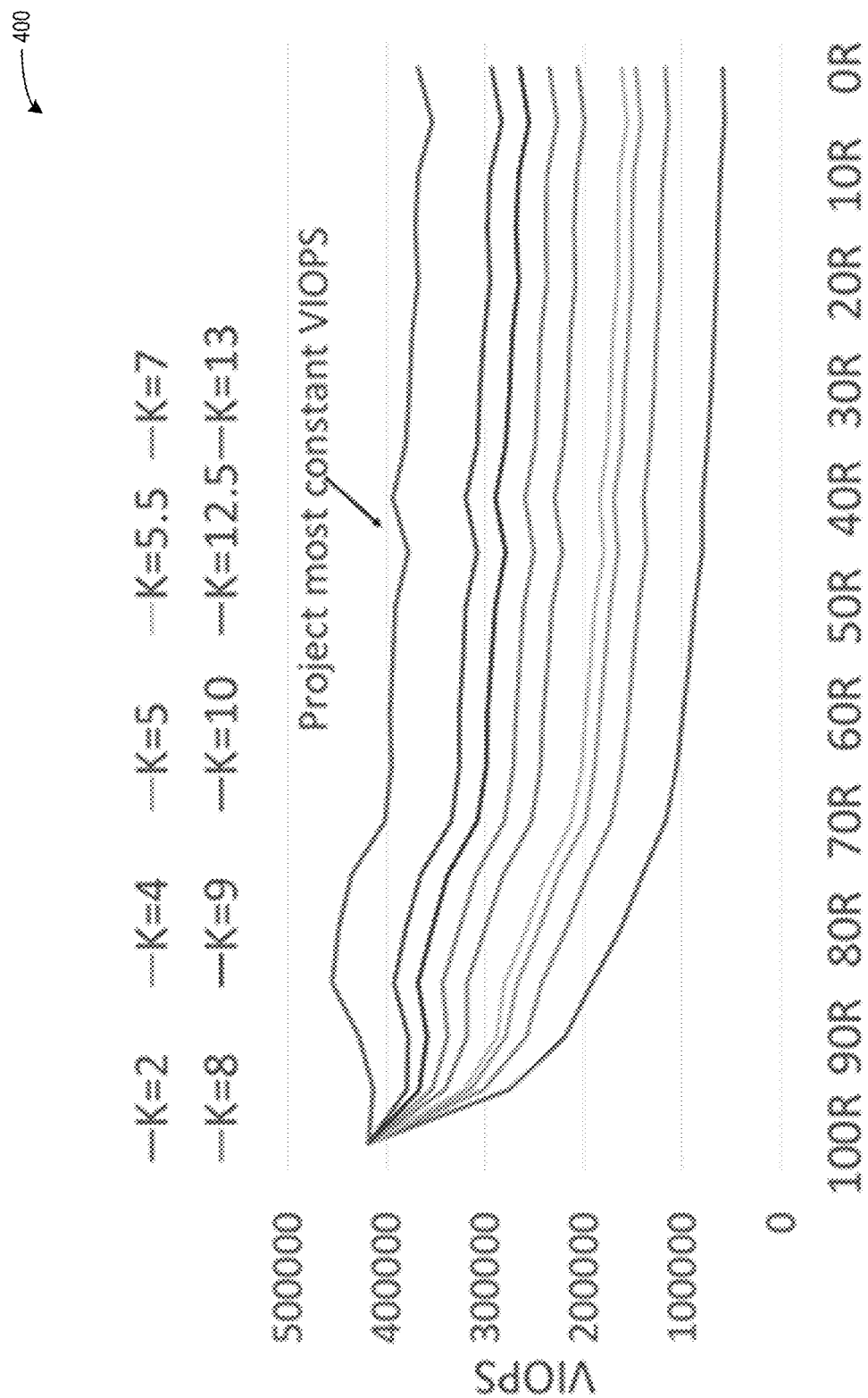
FIG. 4 presents a diagram illustrating exemplary test results of measuring VIOPS over varying ratios of read to write requests on a given storage device, based on various test cost factor values, in accordance with an embodiment of the present application.

FIG. 4 presents a diagram 400 illustrating exemplary test results of measuring VIOPS over varying ratios of read to write requests on a given storage device, based on various test cost factor values, in accordance with an embodiment of the present application. The x-axis indicates the varying ratios of read to write requests. That is, "100R" indicates 100% read requests to 0% write requests, "90R" indicates 90% read requests to 10% write requests, etc. The y-axis indicates the measured virtual I/O operations per second consumed by the storage device. Note that the value of the cost factor which provides the most constant VIOPS for the given storage device is when k=13. Note that the results in diagram 400 can reflect a specific I/O request size, with varying ratios of read to write requests.

Figure 5:
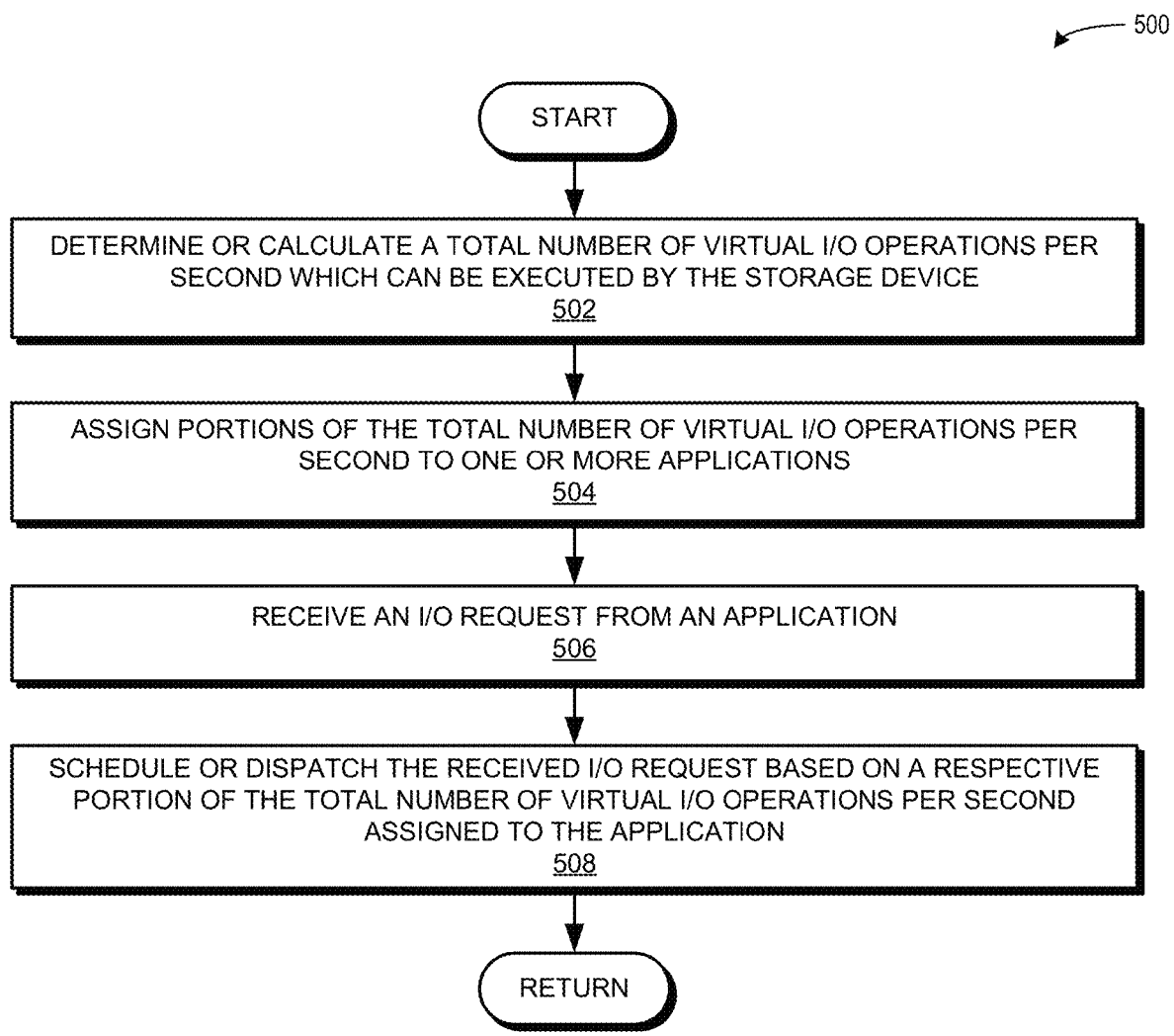
FIG. 5 presents a flowchart illustrating a method for scheduling I/O requests based on priority and allocated VIOPS, in accordance with an embodiment of the present application.

Exemplary Method for Scheduling I/O Requests Based on Priority and Allocated VIOPS; Exemplary Pseudocode for Scheduling I/O Requests FIG. 5 presents a flowchart illustrating a method for scheduling I/O requests based on priority and allocated VIOPS, in accordance with an embodiment of the present application. During operation, the system determines or calculates a total number of virtual I/O operations per second which can be executed by the storage device (operation 502), i.e., the number of VIOPS which can be served by the storage device. The system assigns portions of the total number of VIOPS to one or more applications (operation 504). Assigning the portions of the VIOPS can be based on, e.g.: a priority associated with a respective application; a user associated with the respective application; a predetermined time period which, when exceeded, causes a refresh or reassigning of the portions of the total VIOPS.

Subsequently, the system receives an I/O request from an application (operation 506). The system schedules or dispatches the received I/O request based on a respective portion of the total number of VIOPS assigned to the application (operation 508). Scheduling the I/O request can be further based on one or more of: a priority associated with the I/O request; a priority associated with the respective application; and a user associated with the respective application. An exemplary priority-aware I/O scheduler is described above in relation to FIGS. 2A and 2B.

FIG. 6 presents exemplary pseudocode 600 for scheduling or dispatching an I/O request based on priority and allocated VIOPS, in accordance with an embodiment of the present application.

Figure 7A:
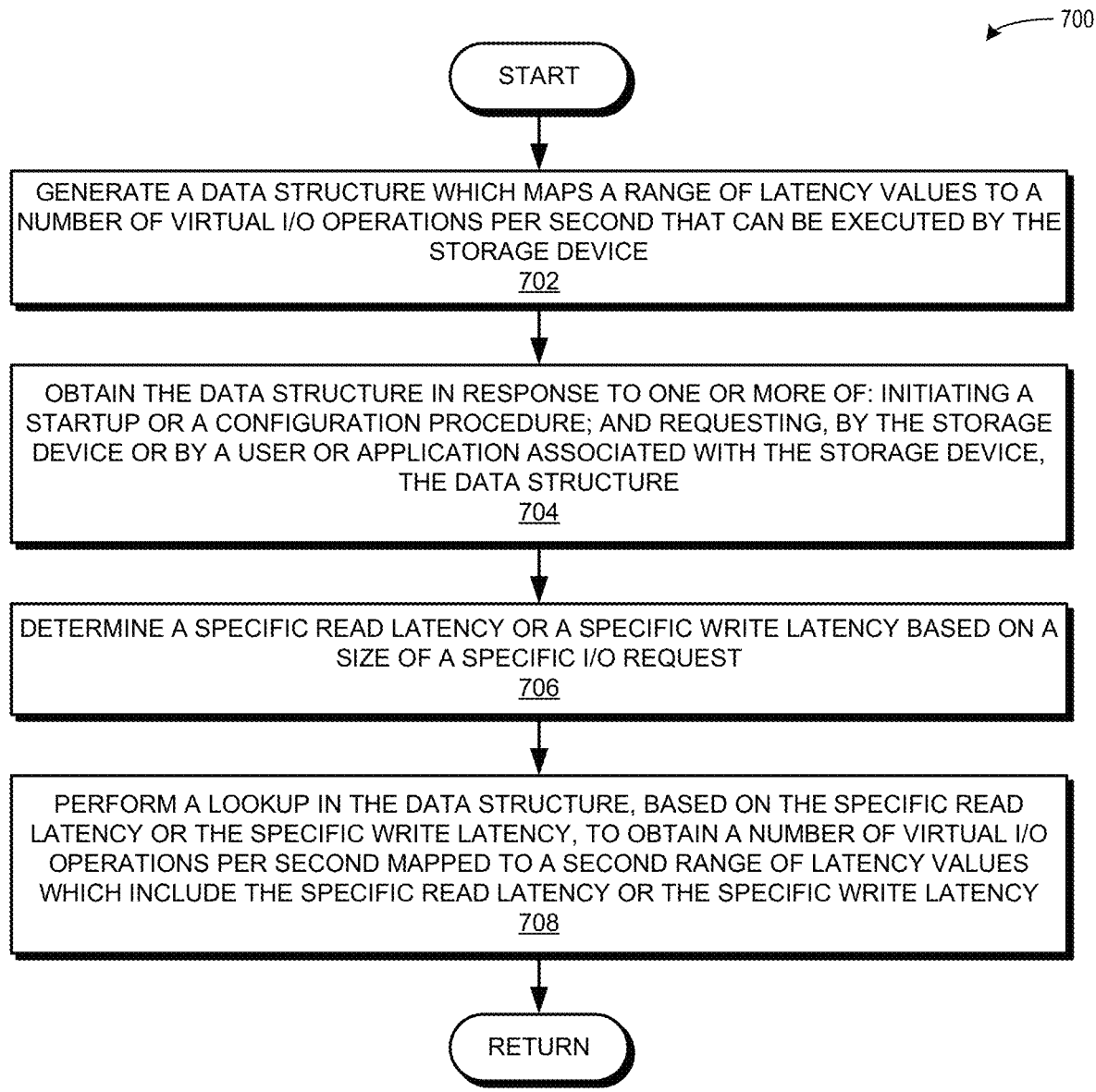
FIG. 7A presents a flowchart illustrating a method for looking up VIOPS capability in a given storage device based on a specific target latency value, in accordance with an embodiment of the present application.

Exemplary Method for Looking Up VIOPS Capability Based on Target Latency; Exemplary Data Structure FIG. 7A presents a flowchart 700 illustrating a method for looking up VIOPS capability in a given storage device based on a specific target latency value, in accordance with an embodiment of the present application. During operation, the system generates a data structure which maps a range of latency values to a number of virtual I/O operations per second that can be executed by the storage device (operation 702). The system obtains the data structure in response to one or more of: initiating a startup or a configuration procedure; and requesting, by the storage device or by a user or application associated with the storage device, the data structure (operation 704). The system determines a specific read latency or a specific write latency based on a size of a specific I/O request (operation 706). The system performs a lookup in the data structure, based on the specific read latency or the specific write latency, to obtain a number of virtual I/O operations per second mapped to a second range of latency values which include the specific read latency or the specific write latency (operation 708).

FIG. 7B illustrates an exemplary data structure 750 mapping target latency range values to VIOPS capability in a given storage device, in accordance with an embodiment of the present application. Data structure 750 can include entries which include a latency range 752 and a maximum VIOPS executable by the storage device 754. For example, an entry 760 can include a latency range of "101 microseconds-300 microseconds" and a maximum VIOPS value of "300,000." Similarly, an entry 762 can include a latency range of "301 microseconds 500 microseconds" and a maximum VIOPS value of "200,000."

Exemplary Computer System and Apparatus

Figure 8:
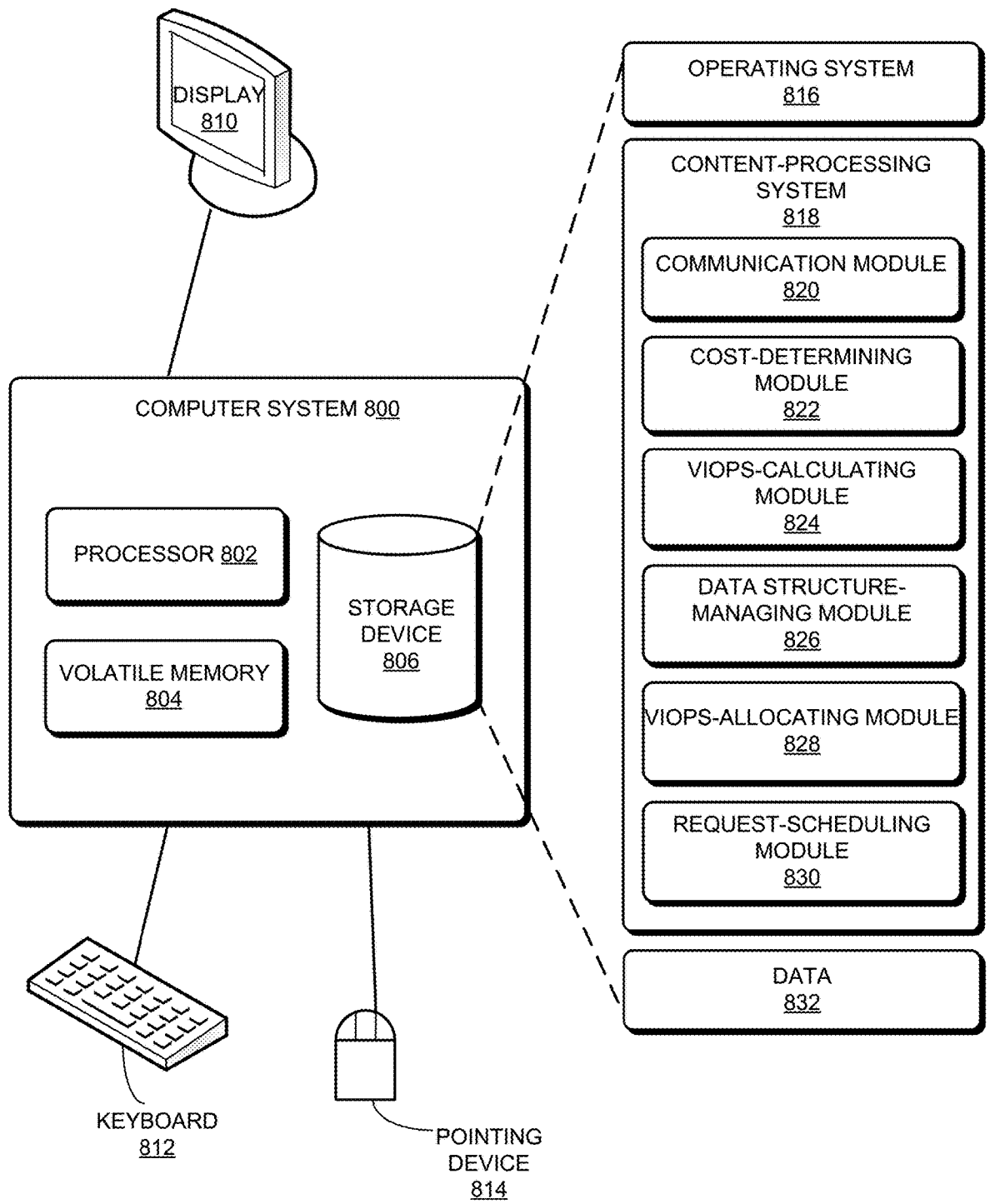
FIG. 8 illustrates an exemplary computer system that facilitates measurement of the performance of a storage device, in accordance with an embodiment of the present application.

FIG. 8 illustrates an exemplary computer system 800 that facilitates measurement of the performance of a storage device, in accordance with an embodiment of the present application. Computer system 800 includes a processor 802, a volatile memory 804, and a storage device 806. Computer system 800 may be a computing device or a storage device. Volatile memory 804 can include memory (e.g., RAM) that serves as a managed memory, and can be used to store one or more memory pools. Computer system 800 can be coupled to a display device 810, a keyboard 812, and a pointing device 814. Storage device 806 can store an operating system 816, a content-processing system 818, and data 832.

Content-processing system 818 can include instructions, which when executed by computer system 800, can cause computer system 800 to perform methods and/or processes described in this disclosure. For example, content-processing system 818 can include instructions for receiving and transmitting data packets, including a request to write or read data, an I/O request, data to be encoded and stored, or a block or a page of data.

Content-processing system 818 can further include instructions for determining a normalized cost for an I/O request, wherein the normalized cost is independent of an access pattern and a type of the I/O request, wherein the normalized cost is indicated by a first number of virtual I/O operations consumed by the I/O request, and wherein a virtual I/O operation is used as a logical unit of cost associated with physical I/O operations (cost-determining module 822). Content-processing system 818 can include instructions for identifying a performance metric for the storage device by calculating a second number of virtual I/O operations per second which can be executed by the storage device, thereby facilitating an enhanced measurement of the performance of the storage device (VIOPS-calculating module 824). Content-processing system 818 can include instructions for allocating incoming I/O requests to the storage device based on the performance metric to satisfy a Quality of Service requirement (request-scheduling module 830).

Content-processing system 818 can also include instructions for determining a cost factor for the I/O request (cost-determining module 822). Content-processing system 818 can include instructions for generating a data structure which maps a range of latency values to a fourth number of virtual I/O operations per second that can be executed by the storage device (data structure-managing module 826). Content-processing system 818 can include instructions for determining a specific read latency or a specific write latency based on a size of a specific I/O request (data structure-managing module 826). Content-processing system 818 can additionally include instructions for performing a lookup in the data structure, based on the specific read latency or the specific write latency, to obtain a fifth number of virtual I/O operations per second mapped to a second range of latency values which include the specific read latency or the specific write latency (data structure-managing module 826).

Content-processing system 818 can further include instructions for assigning portions of the second number of virtual I/O operations per second to one or more applications (VIOPS-allocating module 828). Content-processing system 818 can include instructions for receiving a second I/O request from an application (communication module 820). Content-processing system 818 can include instructions for scheduling the second I/O request based on a respective portion of the second number of virtual I/O operations per second assigned to the application (request-scheduling module 830).

Data 832 can include any data that is required as input or that is generated as output by the methods and/or processes described in this disclosure. Specifically, data 832 can store at least: data to be stored, written, loaded, moved, retrieved, accessed, deleted, or copied; a cost; a normalized cost; a request; an I/O request; a physical I/O operation; an access pattern of an I/O request; a type or size of an I/O request; a virtual I/O; a number of virtual I/Os; a logical unit of cost associated with physical I/O operations; a number of virtual I/O per second (VIOPS); a performance metric; the measurement of the performance of a storage device based on the VIOPS; a cost factor; a set of test cost factor values; a varied workload; varying I/O request sizes; a varying ratio of read I/O request to write I/O requests; a projection of VIOPS across a workload; a predetermined size for a base unit; a first ratio of an I/O request size to the predetermined base unit size; a data structure; a data structure entry; a latency value; a range of latency values; an entry mapping a range of latency values to a number of VIOPS that can be executed by a storage device; a startup or a configuration procedure; a request for the data structure; a read latency; a write latency; an assigned portion of a number of VIOPS; an application; an application-allocated VIOPS portion; a priority or a user associated with an I/O request or an application; a predetermined time period; and a new or updated re-assigned or re-allocated portion of the number of VIOPS.

Figure 9:
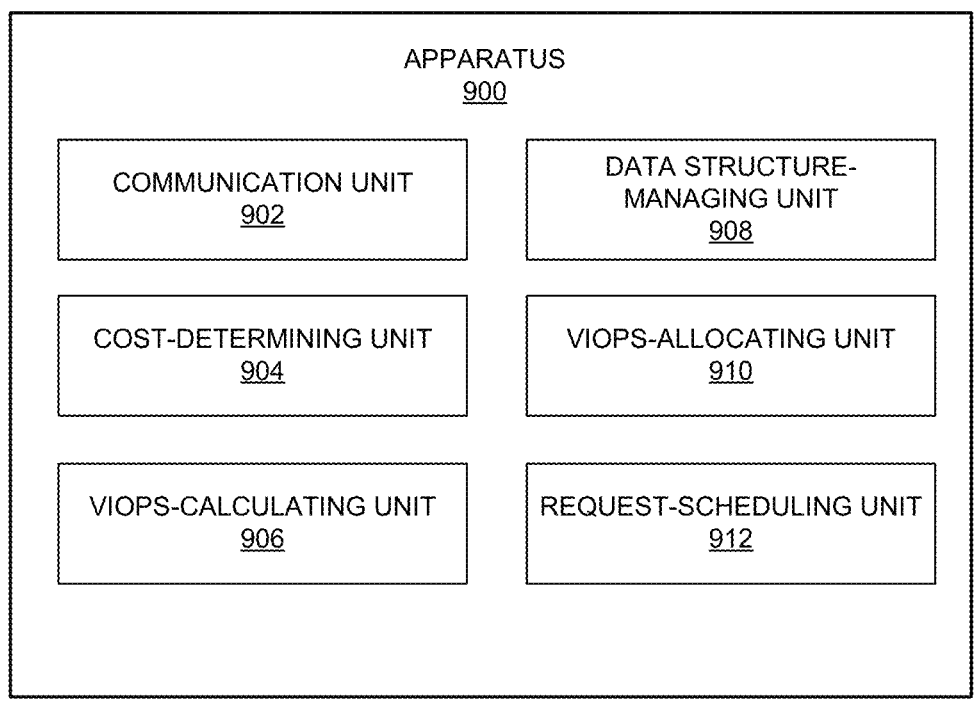
FIG. 9 illustrates an exemplary apparatus that facilitates measurement of the performance of a storage device, in accordance with an embodiment of the present application.

FIG. 9 illustrates an exemplary apparatus 900 that facilitates measurement of the performance of a storage device, in accordance with an embodiment of the present application. Apparatus 900 can comprise a plurality of units or apparatuses which may communicate with one another via a wired, wireless, quantum light, or electrical communication channel. Apparatus 900 may be realized using one or more integrated circuits, and may include fewer or more units or apparatuses than those shown in FIG. 9. Further, apparatus 900 may be integrated in a computer system, or realized as a separate device which is capable of communicating with other computer systems and/or devices. Specifically, apparatus 900 can comprise units 902-912 which perform functions or operations similar to modules 820-830 of computer system 800 of FIG. 8, including: a communication unit 902; a cost-determining unit 904; a VIOPS-calculating unit 906; a data structure-managing unit 908; a VIOPS-allocating unit 910; and a request-scheduling unit 912.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating measurement of a performance of a storage device, the method comprising:
    determining a normalized cost for an I/O request, wherein the normalized cost is independent of an access pattern and a type of the I/O request, wherein the normalized cost is indicated by a first number of virtual I/O operations consumed by the I/O request, and wherein a virtual I/O operation is used as a logical unit of cost associated with physical I/O operations;
    identifying a performance metric for the storage device by calculating a second number of virtual I/O operations per second which can be executed by the storage device;
    allocating incoming I/O requests to the storage device based on the performance metric;
    assigning portions of the second number of virtual I/O operations per second to one or more applications;
    receiving a second I/O request from an application; and
    scheduling the second I/O request based on a respective portion of the second number of virtual I/O operations per second assigned to the application.

2. The method of claim 1, wherein determining the normalized cost comprises:
    determining a cost factor for the I/O request, which involves:
        selecting a set of test cost factor values;
        executing varied workloads on the storage device based on varying I/O request sizes and a varying ratio of read I/O requests to write I/O requests;
        measuring the performance of the storage device based on a third number of virtual I/O operations per second executed on the storage device for each workload;
        determining a test cost factor value which projects a most constant virtual I/O operations per second performance across all the workloads; and
        setting the cost factor for the I/O request to the determined test cost factor value.

3. The method of claim 1, further comprising:
    generating a data structure which maps a range of latency values to a fourth number of virtual I/O operations per second that can be executed by the storage device.

4. The method of claim 1, wherein assigning the portions of the second number of virtual I/O operations per second is based on one or more of:
    a priority associated with a respective application;
    a user associated with the respective application; and
    a predetermined time period which, when exceeded, causes a refresh or reassigning of the portions of the second number of virtual I/O operations per second to the one or more application.

5. The method of claim 1, wherein scheduling the second I/O request is further based on:
    a priority associated with the second I/O request;
    a priority associated with the respective application; and
    a user associated with the respective application.

6. The method of claim 2, wherein determining the normalized cost further comprises:
    determining a first ratio of a size of the I/O request to a predetermined size for a base unit; and
    scaling the first ratio by the determined cost factor for the I/O request.

7. The method of claim 3, further comprising:
    obtaining the data structure in response to one or more of:
        initiating a startup or a configuration procedure; and
        requesting, by the storage device or by a user or application associated with the storage device, the data structure.

8. The method of claim 3, further comprising:
    determining a specific read latency or a specific write latency based on a size of a specific I/O request; and
    performing a lookup in the data structure, based on the specific read latency or the specific write latency, to obtain a fifth number of virtual I/O operations per second mapped to a second range of latency values which include the specific read latency or the specific write latency.

9. A computer system for facilitating measurement of a performance of a storage device, the system comprising:
    a processor; and
    a memory coupled to the processor and storing instructions, which when executed by the processor cause the processor to perform a method, the method comprising:
        determining a normalized cost for an I/O request, wherein the normalized cost is independent of an access pattern and a type of the I/O request, wherein the normalized cost is indicated by a first number of virtual I/O operations consumed by the I/O request, and wherein a virtual I/O operation is used as a logical unit of cost associated with physical I/O operations;
        identifying a performance metric for the storage device by calculating a second number of virtual I/O operations per second which can be executed by the storage device;
        allocating incoming I/O requests to the storage device based on the performance metric;
        assigning portions of the second number of virtual I/O operations per second to one or more applications;
        receiving a second I/O request from an application; and
        scheduling the second I/O request based on a respective portion of the second number of virtual I/O operations per second assigned to the application.

10. The computer system of claim 9, wherein determining the normalized cost comprises:
  determining a cost factor for the I/O request, which involves:
    selecting a set of test cost factor values;
    executing varied workloads on the storage device based on varying I/O request sizes and a varying ratio of read I/O requests to write I/O requests;
    measuring the performance of the storage device based on a third number of virtual I/O operations per second executed on the storage device for each workload;
    determining a test cost factor value which projects a most constant virtual I/O operations per second performance across all the workloads; and
    setting the cost factor for the I/O request to the determined test cost factor value.

11. The computer system of claim 9, wherein the method further comprises:
  generating a data structure which maps a range of latency values to a fourth number of virtual I/O operations per second that can be executed by the storage device.

12. The computer system of claim 9, wherein assigning the portions of the second number of virtual I/O operations per second is based on one or more of:
  a priority associated with a respective application;
  a user associated with the respective application; and
  a predetermined time period which, when exceeded, causes a refresh or reassigning of the portions of the second number of virtual I/O operations per second to the one or more application.

13. The computer system of claim 9, wherein scheduling the second I/O request is further based on:
  a priority associated with the second I/O request;
  a priority associated with the respective application; and
  a user associated with the respective application.

14. The computer system of claim 10, wherein determining the normalized cost further comprises:
  determining a first ratio of a size of the I/O request to a predetermined size for a base unit; and
  scaling the first ratio by the determined cost factor for the I/O request.

15. The computer system of claim 11, wherein the method further comprises:
  obtaining the data structure in response to one or more of:
    initiating a startup or a configuration procedure; and
    requesting, by the storage device or by a user or application associated with the storage device, the data structure.

16. The computer system of claim 11, wherein the method further comprises:
  determining a specific read latency or a specific write latency based on a size of a specific I/O request; and
  performing a lookup in the data structure, based on the specific read latency or the specific write latency, to obtain a fifth number of virtual I/O operations per second mapped to a second range of latency values which include the specific read latency or the specific write latency.

17. An apparatus for facilitating measurement of a performance of a storage device, the device comprising:
  a cost-determining module configured to determine a normalized cost for an I/O request, wherein the normalized cost is independent of an access pattern and a type of the I/O request, wherein the normalized cost is indicated by a first number of virtual I/O operations consumed by the I/O request, and wherein a virtual I/O operation is used as a logical unit of cost associated with physical I/O operations;
  a virtual I/O operation per second (VIOPS) calculating module configured to identify a performance metric for the storage device by calculating a second number of virtual I/O operations per second which can be executed by the storage device;
  a request-scheduling module configured to allocate incoming I/O requests to the storage device based on the performance metric,
  wherein the cost-determining module is further configured to determine a cost factor for the I/O request, which involves:
    selecting a set of test cost factor values;
    executing varied workloads on the storage device based on varying I/O request sizes and a varying ratio of read I/O requests to write I/O requests;
    measuring the performance of the storage device based on a third number of virtual I/O operations per second executed on the storage device for each workload;
    determining a test cost factor value which projects a most constant virtual I/O operations per second performance across all the workloads; and
    setting the cost factor for the I/O request to the determined test cost factor value.

18. The apparatus of claim 17, wherein the cost-determining module is further configured to:
  determine a first ratio of a size of the I/O request to a predetermined size for a base unit; and
  scale the first ratio by the determined cost factor for the I/O request.

* * * * *